(12) United States Patent
Jeanvoine et al.

(10) Patent No.: US 7,565,819 B2
(45) Date of Patent: Jul. 28, 2009

(54) METHOD AND DEVICE FOR MELTING AND REFINING MATERIALS CAPABLE OF BEING VITRIFIED

(75) Inventors: Pierre Jeanvoine, Poissy (FR); Tanguy Massart, Poyanne (FR); Ramon Rodriguez Cuartas, Aviles (ES); Armando Rodriguez Rodriguez, Aviles (ES); Juan-Andres Nunez Hernandez, Salinas (ES)

(73) Assignee: Saint-Gobain Glass France, Courbevoie (FR)

( * ) Notice: Subject to any disclaimer, the term of this patent is extended or adjusted under 35 U.S.C. 154(b) by 148 days.

(21) Appl. No.: 11/220,683

(22) Filed: Sep. 8, 2005

(65) Prior Publication Data

US 2006/0000239 A1 Jan. 5, 2006

Related U.S. Application Data

(62) Division of application No. 09/381,631, filed as application No. PCT/FR99/00123 on Jan. 22, 1999, now abandoned.

(30) Foreign Application Priority Data

Jan. 26, 1998 (FR) .................................. 98 00806

(51) Int. Cl.
*C03B 5/14* (2006.01)
(52) U.S. Cl. ...................... 65/134.7; 65/134.1; 65/134.9
(58) Field of Classification Search .................. 65/33.1, 65/134.1, 157, 356, 374.12, 135.6, 326, 141, 65/474, 134.7, 134.9, 178; 432/248
See application file for complete search history.

(56) References Cited

U.S. PATENT DOCUMENTS

| 1,577,602 | A | | 3/1926 | Amsler |
| 2,212,528 | A | * | 8/1940 | Slayter ...................... 65/135.8 |
| 2,274,643 | A | * | 3/1942 | Adams ....................... 65/30.1 |
| 2,634,555 | A | | 4/1953 | Henry et al. |

(Continued)

FOREIGN PATENT DOCUMENTS

DE 160 186 5/1983

(Continued)

OTHER PUBLICATIONS

Koz'min, et al., "An Experimental Furnace with Gas Combustion in the Melt and Thin-Layer Fining", Glass and Ceramics, vol. 31, No. 9/10, pp. 623-625 (1975).

(Continued)

*Primary Examiner*—Steven P Griffin
*Assistant Examiner*—Cynthia Szewczyk
(74) *Attorney, Agent, or Firm*—Oblon, Spivak, McClelland, Maier & Neustadt, P.C.

(57) ABSTRACT

The subject of the invention is a process for melting and refining vitrifiable materials, such that all or part of the thermal energy necessary for melting the said vitrifiable materials is supplied by the combustion of fossil fuel(s) with at least one oxidizer gas, the said fuel(s)/gas or the gaseous products resulting from the combustion being injected below the level of the mass of vitrifiable materials (7). The refining of the vitrifiable materials after melting takes place at least partly in the form of a "thin layer". The invention also relates to the device for implementing the process and to its applications.

27 Claims, 5 Drawing Sheets

U.S. PATENT DOCUMENTS

Figure 1:
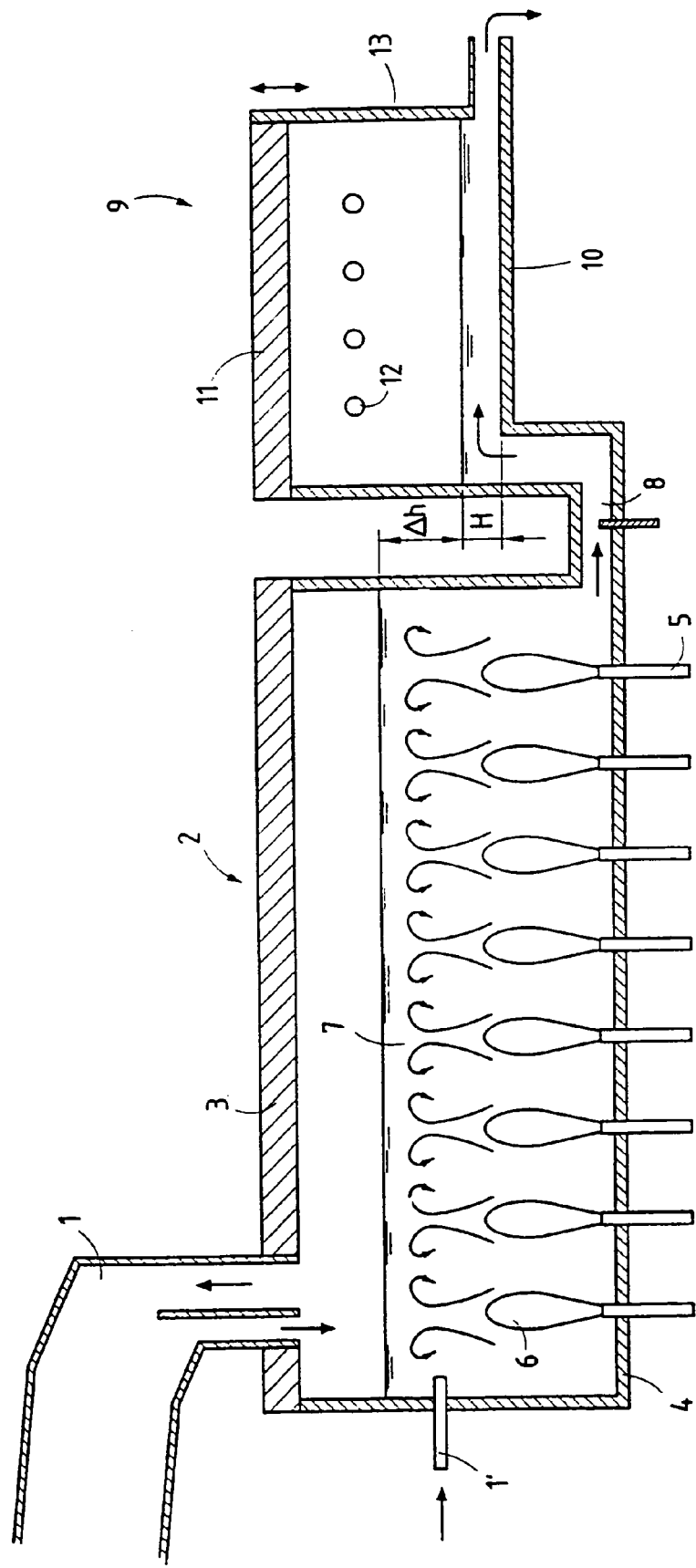

| | | | |
|---|---|---|---|
| 2,871,000 A * | 1/1959 | Dowling | 366/289 |
| 3,170,781 A | 2/1965 | Keefer | |
| 3,248,205 A * | 4/1966 | Marceau et al. | 65/335 |
| 3,260,587 A | 7/1966 | Dolf et al. | |
| 3,261,677 A | 7/1966 | Plumat | |
| 3,463,626 A | 8/1969 | Le Blanc | |
| 3,606,825 A | 9/1971 | Johnson | |
| 3,633,890 A * | 1/1972 | Kozmin | 432/248 |
| 3,754,886 A * | 8/1973 | Richards et al. | 65/134.7 |
| 3,764,287 A | 10/1973 | Brocious | |
| 3,812,620 A | 5/1974 | Titus et al. | |
| 3,938,981 A * | 2/1976 | St. John | 65/134.7 |
| 3,951,635 A * | 4/1976 | Rough, Sr. | 65/134.9 |
| 4,247,320 A * | 1/1981 | Bansal et al. | 65/134.7 |
| 4,504,302 A * | 3/1985 | Carman | 65/134.9 |
| 4,539,034 A | 9/1985 | Hanneken | |
| 4,545,800 A | 10/1985 | Won et al. | |
| 4,738,938 A * | 4/1988 | Kunkle et al. | 501/72 |
| 4,882,736 A | 11/1989 | Pieper | |
| 4,919,697 A | 4/1990 | Pecoraro et al. | |
| 4,932,035 A | 6/1990 | Pieper | |
| 4,983,549 A | 1/1991 | Greve | |
| 5,188,649 A | 2/1993 | Macedo et al. | |
| 5,529,594 A * | 6/1996 | Wetmore et al. | 65/376 |
| 5,567,218 A | 10/1996 | Ladirat et al. | |
| 5,615,626 A * | 4/1997 | Floyd et al. | 110/346 |
| 5,643,350 A | 7/1997 | Mason et al. | |
| 5,795,477 A * | 8/1998 | Herman et al. | 210/360.1 |
| 5,895,511 A | 4/1999 | Tikhonova | |
| 5,922,097 A | 7/1999 | Kobayashi et al. | |
| 6,066,771 A | 5/2000 | Floyd et al. | |
| 6,085,551 A | 7/2000 | Pieper et al. | |
| 6,125,658 A * | 10/2000 | Maugendre et al. | 65/135.6 |
| 6,401,492 B1 * | 6/2002 | Nattermann | 65/347 |
| 6,460,376 B1 * | 10/2002 | Jeanvoine et al. | 65/134.2 |
| 6,715,319 B2 * | 4/2004 | Barrow et al. | 65/134.9 |
| 6,739,152 B2 * | 5/2004 | Jeanvoine et al. | 65/346 |
| 6,795,484 B1 * | 9/2004 | Huber et al. | 373/27 |
| 2006/0000239 A1 | 1/2006 | Jeanvoine et al. | |

FOREIGN PATENT DOCUMENTS

| | | |
|---|---|---|
| DE | 197 10 351 C1 | 5/1998 |
| EP | 0 317 551 A2 | 5/1989 |
| EP | 0 864 543 | 4/2000 |
| FR | 2 150 878 | 4/1973 |
| GB | 1 490 426 | 2/1975 |
| GB | 1389881 | 4/1975 |
| JP | 61-048438 | 3/1986 |
| SU | 1 567 527 | 5/1990 |
| SU | 1 659 363 | 6/1991 |

OTHER PUBLICATIONS

Y.S. Zaytcev, et al., "The Evaporation Cooling of the Walls of the Glass Melting Furnaces," Harkov Publishing House, "The Basis" at the Harkov State University, pp. 13 and 14 (1963) (originally cited in the Turkish Patent Office) and an English translation.

O.N. Popov, et al., Production and Use of Fused Cast Refractories, Metallurgy Publishing House (1985) (original and English translation).

"Glass", Merriam-Webster's Collegiate Dictionary, 10$^{th}$ ed., Springfield, Massachusetts, p. 495 (1999).

U.S. Appl. No. 12/240,068, filed Sep. 29, 2008, Jeanvoine, et al.

* cited by examiner

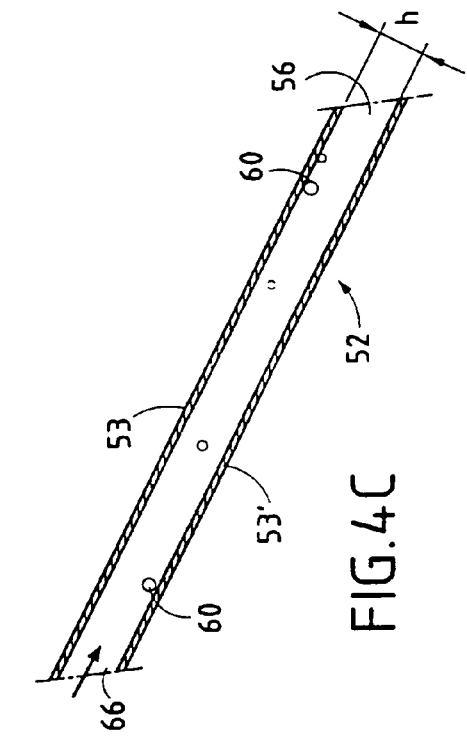
FIG.4A
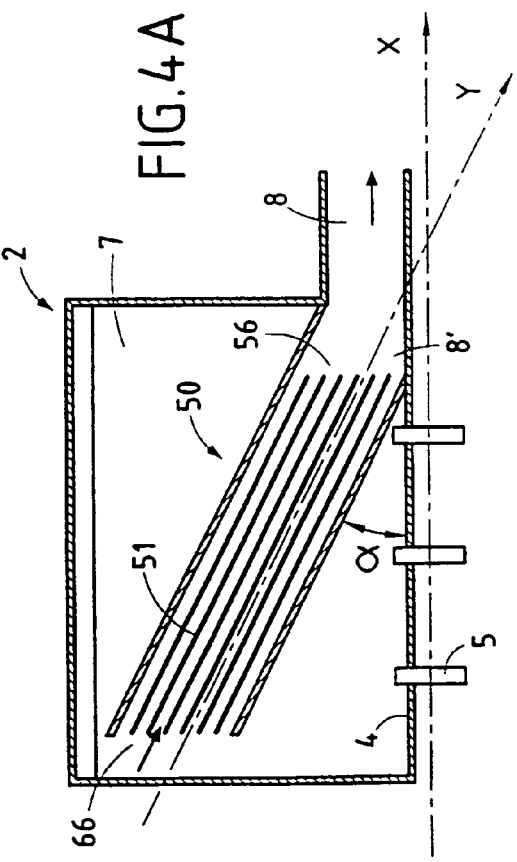
FIG.4B
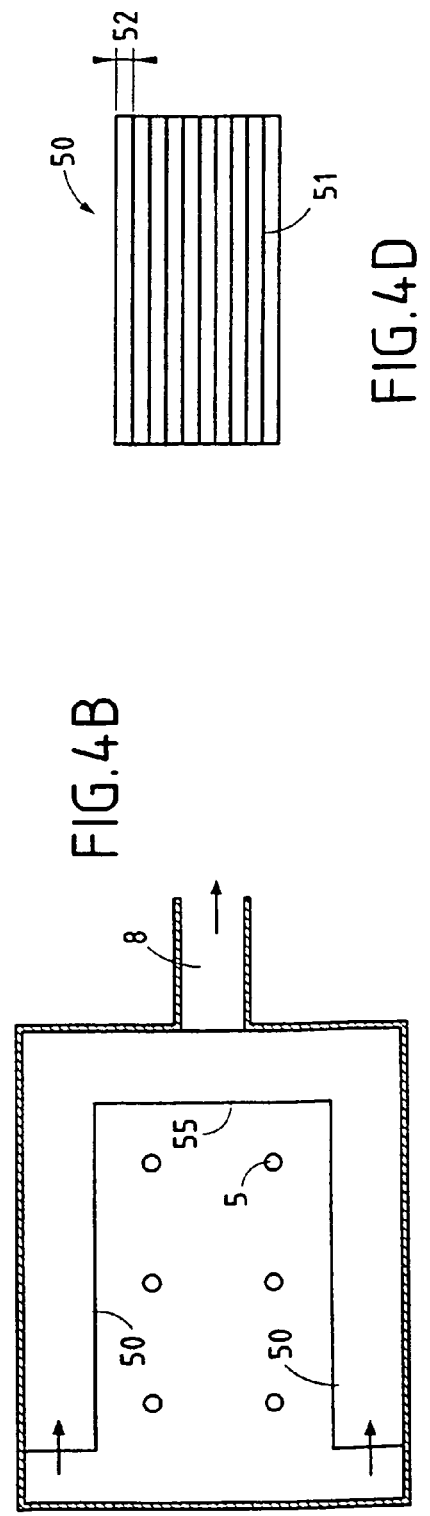
FIG.4C
FIG.4D
FIG.4

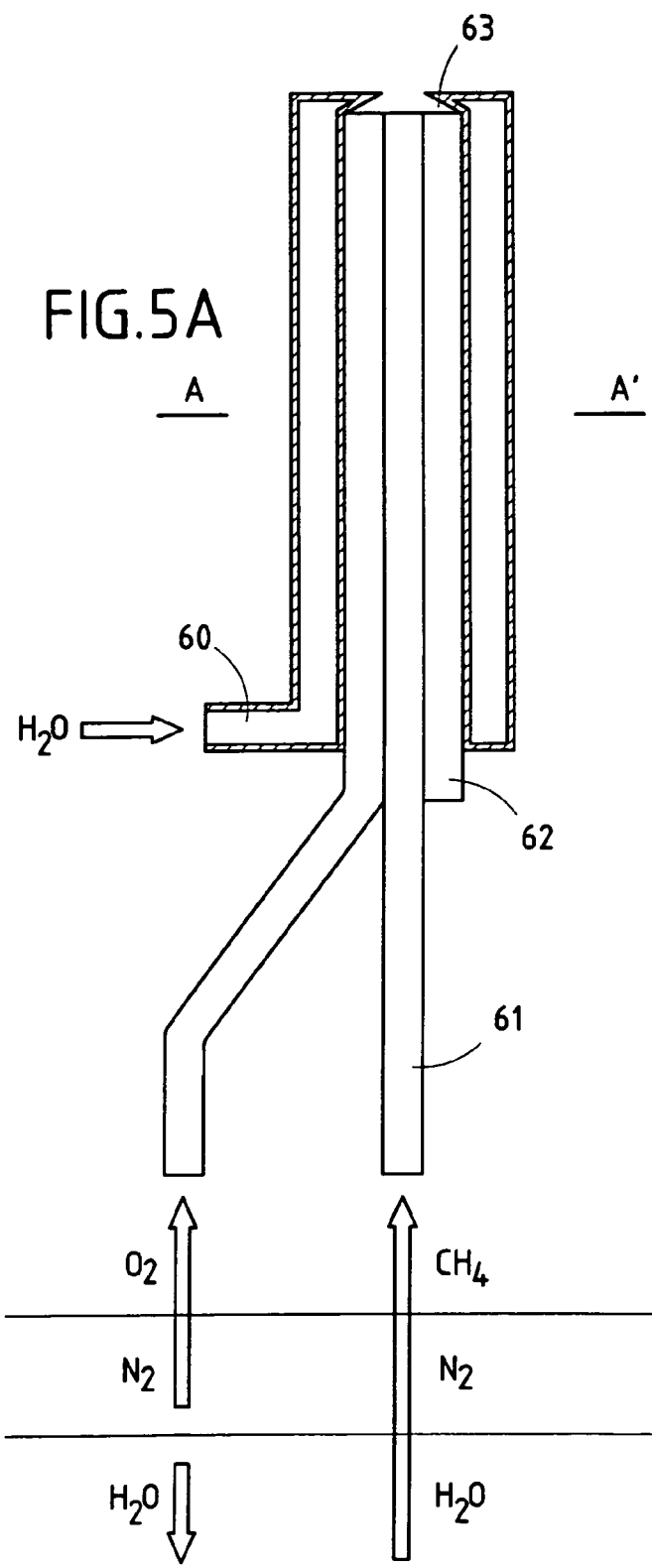
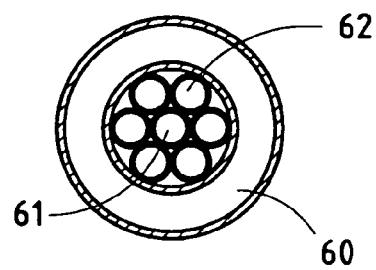
FIG. 5

METHOD AND DEVICE FOR MELTING AND REFINING MATERIALS CAPABLE OF BEING VITRIFIED

This is a divisional application of U.S. application Ser. No. 09/381,631, filed Mar. 1, 2000 now abandoned, which is a 371 of PCT/FR99/00123, filed Jan. 22, 1999.

The invention relates to a process for melting and refining vitrifiable materials for the purpose of continuously feeding glass-forming plants with molten glass.

More particularly intended are plants for forming flat glass such as float or rolling plants, but also plants for forming glassware of the bottle or flask type, plants for forming glass fibres of the mineral wool type for thermal or acoustic insulation or else textile glass fibres called reinforcing fibres.

A great deal of research has been carried out on these processes, which schematically comprise a first melting step followed by a refining step intended to condition the molten glass thermally and chemically and in eliminating therefrom any batch stone, bubbles or any cause of defects appearing after forming.

In the melting range, it has thus been sought, for example, to speed up the melting process or to improve its energy efficiency. Mention may thus be made of the process consisting in rapidly heating the vitrifiable materials in a homogeneous and controlled manner while carrying out intense mechanical stirring allowing the still-solid vitrifiable materials to be brought into intimate contact with the already-liquid phase. This process is especially detailed in Patents FR-2,423,452, FR-2,281,902, FR-2,340,911 and FR-2,551,746 and generally uses electrical heating means of the submerged-electrode type.

Another type of melting process has been developed, for example of the type of those described in U.S. Pat. Nos. 3,627,504, 3,260,587 or 4,539,034 which consist in using, as heating means, submerged burners, that is to say burners fed with gas and air, these generally being placed so as to be flush with the siege so that the flame develops within the mass of vitrifiable materials during liquefaction.

In either case, although it is possible actually to very significantly reduce the residence time of the vitrifiable materials in the melting chamber and to considerably increase the production efficiency compared with "conventional" melting operations, the molten glass being molten is, on the other hand, in the form of a foam which is difficult to refine—it is especially difficult to guarantee the quality of the final glass, especially optical glass.

Research has also been conducted in the refining field. Thus, a centrifugal refining process is, for example, known from Patent FR-2,132,028, this process using a device whose internal walls define a cylindrical chamber which has a vertical axis and is rotated. The molten glass feeds the device at the top and is distributed in the chamber, by defining a paraboloidal cavity which is established naturally due to the effect of the centrifugal force.

The object of the invention is therefore to improve melting and refining processes, aiming especially to use plants which are more compact and/or to have greater operating flexibility and/or greater production efficiency and/or to manufacture glass that has hitherto been difficult to melt or to refine and/or with a low energy cost, etc., without these industrial advantages being obtained to the detriment of the quality of the glass produced.

The subject of the invention is firstly a process for melting and refining vitrifiable materials, which is characterized by the combination of two characteristics:

on the one hand, all or part of the thermal energy necessary for melting the vitrifiable materials is supplied by the combustion of fossil fuel(s) with at least one oxidizer gas, the said fuels/gas or the gaseous products resulting from the combustion being injected below the level of the mass of vitrifiable materials, on the other hand, the refining of the vitrifiable materials after melting takes place at least partly in the form of a "thin layer".

In the context of the invention, "thin-layer" refining should be understood to mean refining in which the molten vitrifiable materials are forced to flow over a very small depth/thickness—to be more specific, at most 15 cm and even at most 10 cm for example —this being achieved by various means. The molten materials may especially be forced to flow between two physical walls close together, the distance separating them defining the depth/thickness of the thin layer (the flow being obtained by the centrifugal force or simply by gravity, for example). These thin-layer characteristics may also be obtained by other means, especially by the choice of the dimensions of the refining compartment or compartments, the choice of the means for feeding them as input or for drawing them off as output. Some of these means will be explained below. In fact, the major advantage of thus imposing a small thickness on the stream of vitrifiable materials being refined is that it is thus possible to considerably reduce the path taken by bubbles contained in these molten materials to the free surface of the latter or to the walls that they are forced to hug, and that this makes it easier for these bubbles to burst and be removed.

There has in fact proved to be an extremely advantageous synergy from an industrial standpoint between the use of melting called hereafter "melting by submerged burners" for the sake of simplicity and that of "thin-layer" refining as defined previously.

However, since this combination is far from being imposed as evidence, it might be expected that all the advantages mentioned above would be obtained only at the price of mediocre glass quality, which has not been the case. This is because, in the invention, very particular refining is used by additionally changing a size parameter, namely instead of feeding the refining zone with "conventional" molten glass to be refined, it is fed here in fact with a glass obtained by melting by submerged burners, that is to say with glass having very special characteristics in the sense that it is foamy throughout, with a relatively low density compared with that of a standard glass to be refined. Nothing would suggest that an initially relatively foamy glass could be refined in a thin layer.

Surprisingly, this has proved to be possible as it has been discovered that this foamy glass resulting from melting by submerged burners also had the characteristic of containing relatively large bubbles; if is actually in the form of a kind of foam which remains to be refined, it is possible to control the size of the bubbles which it contains and, especially in certain preferred configurations and for certain compositions of vitrifiable materials, to remove almost all the smaller bubbles, that is to say those having a diameter of approximately less than 100 μm and even less than 200 μm, by carrying out, on this glass while it is being melted, a kind of "microrefining" prior to the actual refining after the melting, this microrefining facilitating the coalescence of the bubbles and the disappearance of the smaller bubbles in favour of the larger ones and being promoted by the addition into the vitrifiable materials of refining promoters of the coke or sulphate type. Furthermore, this glass leaving the melting chamber generally has a relatively low residual amount of batch stone: the combination of "large" bubbles and little batch stone thus allows the use of thin-layer refining, greatly facilitating the refining, at least part of which is to have already been carried out de facto during the melting. "Large" bubbles have a greater speed of ascent, coalesce more quickly and finally are removed more quickly.

It should also be noted that, in general, the glass melted by submerged burners only contains a little sulphate, the residual amount of which before refining is less than 600 ppm, especially less than 200 or 100 ppm, or even less than 50 ppm expressed by weight of $SO_3$, whatever the type of vitrifiable material, which may or may not contain unintentional sulphates or which even may have sulphates added to them. This would be explained by the partial pressure of water generated by the submerged combustion.

It should be noted that a desulphated glass gives fewer problems of volatile compounds in the float bath, fewer risks of the formation of tin sulphide and therefore, finally, fewer risks of a tin defect in the sheet of glass. This decreases the amount of sulphides (or even eliminates them completely) in the case of reduced gases, especially iron sulphides which give undesirable yellow/amber residual colours or nickel sulphide inclusions which may cause the glass to break during quenching-type heat treatments.

The invention therefore makes it possible optionally to have glasses which are very low in sulphate even before the refining operation, therefore glasses which are at least as low after refining, this being so without having to purify/select vitrifiable materials so that they are low in sulphate. On the contrary, it is even possible to add sulphate at the start.

One advantageous effect obtained by the combination according to the invention relates to the energy cost of the process: melting by submerged burners makes it possible to avoid using electrical melting of the submerged-electrode type, the cost of which may be very significant depending on the country. Furthermore, and this is the most important point, melting by submerged burners creates convective stirring within the vitrifiable materials during liquefaction, as explained in detail below. This very strong mixing between materials not yet liquefied and those which are already molten is extremely effective and makes it possible to achieve, for vitrifiable materials of the same chemical composition, melting at a lower temperature and/or melting which is much more rapid than with conventional heating means.

The temperatures encountered in melting may be everywhere lower than in the usual processes, something which is economically very advantageous, simply in terms of energy cost, but also by the selection of refractory-type materials used in the manufacture of the plants—materials which are less hot corrode more slowly.

The residence times in the melting and refining zones are significantly reduced and are compatible, this obviously having a very positive effect on the production efficiency and on the output of the plant in its entirety. At the same time, the invention makes it possible to obtain plants which are very compact—this is because melting by submerged burners, again due to the very strong mixing that it causes, allows the size of the melting chamber to be considerably reduced. Furthermore, thin-layer refining has the same consequences on the size of the compartment(s) where this operation is carried out. Thus, by reducing the glass depth during the refining, the bubbles are removed more quickly and it is therefore possible to considerably reduce the "length" (in the direction of flow of the glass) of the refining compartment or compartments. Overall, the plant may therefore be very compact, with clear advantages in terms of construction cost, of operating simplification, of reduction in the wear of the structural materials, etc.

With regard to the melting operation, the oxidizer chosen may, according to the invention, be based on air, on oxygen-enriched air or even substantially based on oxygen. A high oxygen concentration in the oxidizer is in fact advantageous for various reasons: it thus reduces the volume of combustion smoke, this being favourable from the energy standpoint and avoiding any risk of excessive fluidization of the vitrifiable materials which could cause them to splash onto the superstructures or roofs of the melting chamber. Furthermore, "the flames" obtained are shorter and more emissive, allowing more rapid transfer of their energy to the vitrifiable materials and secondarily making it possible to reduce, if desired, the depth of the "bath" of vitrifiable materials being liquefied. We speak here of "flames", but these are not necessarily flames in the usual sense of the term. We may speak, more generally, as in the rest of the text, of "combustion regions". Furthermore, any emission of polluting $NO_x$ gas is thus reduced to the minimum.

With regard to the selection of the fuel, this may or may not be of the gaseous fossil fuel type, such as natural gas, propane, fuel oil or any other hydrocarbon fuel. It may also be hydrogen. The process of melting by submerged burners according to the invention is therefore an advantageous means of using hydrogen, which is, moreover, difficult to use with "overhead", non-submerged, burners, given the low-emissivity character of the flames obtained by $H_2/O_2$ combustion.

Combining the use, in melting by submerged burners, of an oxygen oxidizer and of a hydrogen fuel is a good means of ensuring effective heat transfer of the energy from the burners to the molten glass, leading moreover to a completely "clean" process, that is to say without the emission of nitrogen oxides, $NO_x$, or of greenhouse gases of the $CO_x$ type, other than that which may arise from the decarbonization of the batch materials.

Advantageously, the melting is carried out according to the invention in at least one melting chamber which is equipped with burners which are placed so that their combustion regions or combustion gases develop in the mass of vitrifiable materials during melting. They are thus made to pass through its side walls and/or the siege and/or they are suspended from the top, fastening them to the roof or to any suitable superstructure. These burners may be such that their gas supply pipes are flush with the wall through which they pass. It may be preferable for these pipes to "enter", at least partly, the mass of vitrifiable materials so as to prevent the flames from being too great near the walls and not to cause premature wear of the refractory materials. It is also possible to choose to inject only the combustion gases, the combustion regions being produced outside the melting chamber proper.

As mentioned above, it has turned out that this method of heating caused intense convective stirring of the vitrifiable materials—convection loops thus form on each side of the combustion regions or "flames" or streams of combustion gases, permanently mixing the molten and not yet molten materials very effectively. This thus results in the highly favourable characteristics of "stirred" melting, without having to make use of mechanical stirring means which are not very reliable and/or subject to rapid wear.

Preferably, the height of the mass of vitrifiable materials in the melting chamber and the height at which the combustion regions or gases resulting from the combustion develop are adjusted so that these combustion regions/gases remain within the mass of the said vitrifiable materials—the aim is thus to allow the convective circulation loops to be established in the material during liquefaction.

In general, this type of melting makes it possible to considerably reduce the emission of any type of dust in the melting chamber and of any gas of the $NO_x$ type since heat exchange takes place very quickly, thereby avoiding the temperature peaks likely to be conducive to the formation of these gases. It also considerably reduces the emission of gases of the $CO_x$ type, the total energy consumption of the plant being lower than with conventional apparatuses using fired furnaces, for example those operating in down-draught mode.

Optionally, the melting operation may be preceded by a step of preheating the vitrifiable materials to a temperature which is, however, markedly less than that necessary to liquefy them, for example to at most 900° C. In order to carry out this preheating operation, the thermal energy of the smoke may advantageously be recovered. By thus extracting the heat from the smoke, the specific energy consumption of the plant may be decreased overall.

The vitrifiable materials may comprise batch materials, but also cullet or even scrap intended to be vitrified. They may also comprise combustible elements (organic matter): it is thus possible to recycle, for example, mineral fibres which have been sized with binder (of the type used in thermal or acoustic insulation or of those used in the reinforcement of plastics), window panes laminated with sheets of polymer of the polyvinyl butyral type, such as windscreens, or any type of "composite" material which combines glass with plastics, such as certain bottles. It is thus possible to recycle "glass/metal or metal compound composites" such as window panes functionalized with coatings containing metals, these being difficult hitherto to recycle since this would run the risk of gradually enriching the melting chamber with metals which would build up on the surface of the siege. However, the stirring caused by the melting according to the invention prevents this sedimentation and thus allows, for example, window panes coated with layers of enamel, with layers of metal and/or of various connection elements to be recycled.

The subject of the invention is also the recycling of all these composite elements containing glass because of the melting by submerged burners in a glass furnace. In particular, furnaces with submerged burners may be provided, the essential function of which is the manufacture of a cullet from these various materials to be recycled, which particular cullet may then serve, possibly combined with standard cullet, as batch materials for conventional glass furnaces.

Advantageously, provision may be made to introduce all or part of the vitrifiable materials into the melting chamber below the level of the mass of vitrifiable materials being melted. Some of these materials may be conventionally introduced from above the mass being liquefied and the rest from below, for example by supply means of the feed-screw type. The materials may thus be introduced directly into the mass being liquefied, at a single point or at various points distributed over the walls of the melting chamber. Such an introduction directly into the mass of materials being liquefied (hereafter referred to as the "melt") is advantageous for more than one reason: firstly, it considerably reduces any risk of batch materials flying off above the melt, and therefore reduces the amount of solid dust emitted by the furnace to the minimum. Thus, it allows better control of the minimum residence time of the said materials before they are extracted into the refining zone and allows them to be selectively introduced at the point where the convective stirring is the strongest, depending on the arrangement of the submerged burners. This or these points of introduction into the melt may thus be near the surface or more deeply in the melt, for example at a melt height of between ⅕th and ⅘ths of the total height of the melt above the level of the siege, or else between ⅓ and ⅔ of the said height.

It has been seen that the process according to the invention made it possible to recycle plastics in the form of composite products combined most particularly with glass, these plastics thus serving as part of the fuel. It is also possible, and advantageous, to introduce all or part of the fuel necessary for the melting by submerged burners in the form of a solid fuel (polymer-type organic materials or coal) or even a liquid fuel, this fuel being a partial substitute for at least the liquid (especially fossil) or gaseous fuels feeding the burners. In general, the term "vitrifiable materials" or "batch materials" used in the present text is intended to encompass the materials necessary for obtaining a glassy (or ceramic or glass-ceramic) matrix, but also all the additives (refining additives, etc.), all the optional liquid or solid fuels (plastic of composite or non-composite material, organic matter, coal, etc.), and any type of cullet.

It is also possible to recycle window panes laminated with sheets of polymer of the polyvinyl butyral type, such as windscreens with which vehicles are equipped, or other types of composite materials which combine glass with plastics, such as certain bottles for example.

It is also possible to recycle window panes functionalized with coatings containing metals, these being difficult hitherto to recycle since this would run the risk of gradually enriching the melting chamber with metals that would build up on the surface of the siege. However, the stirring caused by the melting according to the invention prevents this sedimentation and thus allows, for example, window panes coated with layers of enamel, with layers of metal or of various connection elements, to be recycled.

The process according to the invention may operate with a high level of cullet.

As mentioned above, the refining according to the invention is therefore carried out on molten vitrifiable materials of the glass type in the relatively foamy state. Typically, this "foam" has a density of approximately 0.5 to 2 g/cm³, especially 1 to 2 for example (to be compared with a density of about 2.3 or 2.4 in the case of non-foamy glass), it may have a sulphate content of at most 600 or even of at most 100 ppm expressed by weight of $SO_3$ and above all it may contain most of the bubbles having a diameter of at least 100 or 200 μm.

In order to improve the performance characteristics of the refining operation, various refining promoters are preferably added to the vitrifiable materials, the aim being especially to remove from the glass any bubbles having a diameter of less than 100 and even less than 200 μm right from the melting stage, as mentioned above. These may be reducing additives, such as coke (which also allows the redox of the glass to be adjusted). In this case, it is advantageous to select coke powder which has an average particle size of less than 200 μm. They may also be sulphates. Other refining promoters will be effective rather more during the stage of the refining proper, after the melting stage. They allow the foam to be "destabilized": they may, for example, be fluorine or a fluorine or chlorine compound, more generally halides, or else a nitrate of the $NaNO_3$ type; fluorine (halogen) seems to lower the viscosity of the glass and thus helps to drain the films which form between the bubbles, which draining promotes collapse of the foam. It also lowers the surface tension of the glass.

Advantageously, the process according to the invention makes it possible to carry out the melting at temperatures not exceeding 1400° C., especially at 1380 or 1350° C., and the refining at temperatures not exceeding 1500° C.

According to a first variant, the refining according to the invention may be carried out in at least one static compartment (one which does not move during operation) downstream of the melting chamber, of the flow-canal type, and provided with one or more means for forcing the molten vitrifiable materials to be refined in a thin layer, especially to a depth of at most 15 cm or of at most 10 cm. These one or more means may also advantageously help to avoid the formation of a return glass current in the mass of molten vitrifiable materials flowing in the said compartment (s). The "return current" refers to convective recirculation loops that are found within the vitrifiable materials in most conventional refining compartments. For more details regarding one non-limiting way of eliminating this return current and regarding the advantages which are connected therewith, reference may advantageously be made, for example, to Patent EP-616,983.

It has in fact turned out that a very great advantage associated with a thin-layer flow was that any return current could be eliminated, while having a flow in the refining compartment of the plug-flow type. In plug flow, the molten materials no longer have a downward-directed velocity component and the bubbles, tending to rise to the surface of the glass, can no longer be forced to "dive down" again into the bath by entrainment due to the convective recirculation currents, which are thus eliminated.

According to a second variant, the thin-layer refining is carried out either in the melting chamber itself or in at least one static compartment located downstream thereof, by giving the molten vitrifiable materials, by gravity, a downward path between at least two adjacent walls, these being essentially mutually parallel, at least partially submerged in the molten mass and inclined with respect to the plane of the siege of the melting chamber or compartment (or, in other words, walls which are inclined in essentially mutually parallel planes inclined with respect to the longitudinal axis of the melting chamber or of the downstream compartment in question). Advantageously, these walls may be incorporated into one or more structural elements such as tubular elements, especially having an approximately rectangular cross section, which are longitudinally partitioned (by a plurality of partitions): refining is thus obtained by forming a plurality of thin layers of glass to be refined which flow along "lamellae" consisting of the abovementioned walls, the method of operation of this refining being explained in detail below with the aid of the figures.

According to a third variant, the refining is carried out downstream of the melting chamber, but in a compartment capable of being rotated so as to ensure centrifugal refining, this compartment furthermore being provided with one or more means of forcing the molten vitrifiable materials to be refined in a thin layer to a "relative thickness" R1/R0 of at least 0.8 or, in absolute values, to an "absolute thickness" of at most 10 cm.

Within the context of the invention, the ratio R1/R0 should be understood in the following manner: R0 is the average radius of the approximately cylindrical cavity defined by the compartment, through which cavity the molten material flows, and R1 is the average radius of the partitioning means introduced into the cavity in order to force the molten materials to follow a path between the internal walls of the cavity and the partitioning means.

A third variant consists in combining the two previous ones, especially by using, for the refining, a static first compartment and then a rotating second compartment.

(In the context of the invention, the terms "upstream" and "downstream" refer to the direction of flow of the glass through the plant from the point where the vitrifiable materials are fed into the melting chamber to the point where the refined glass is extracted).

The melting/refining process according to the invention allows glasses of highly varied compositions and properties to be manufactured. Moreover, it makes it possible, because of its low inertia, to switch from one composition to another with very short transition times. It allows refined molten glass to be fed into plants for forming flat glass, hollow-ware, glass wool, or glass fibre for reinforcement.

It thus allows relatively reduced glasses, especially those having a redox of greater than or equal to 0.3, to be manufactured. (The redox is defined as the ratio of the ferrous iron FeO content, as a percentage by weight, to the total iron content by weight of the composition expressed in the form of $Fe_2O_3$).

It also allows glasses having a high $SiO_2$ content, for example at least 72 or even at least 75% by weight, to be manufactured, these glasses generally being difficult to melt but advantageous, especially in terms of batch material cost, because they have a low density and are very compatible with plastics. It also makes it possible to manufacture quite special glasses, having a high alkaline-earth oxide content, for example containing at least 18% by weight of CaO, which glasses are, however, quite corrosive using the conventional melting processes at a higher temperature than in the invention, as well as glasses having a low sodium oxide content of at most 11% by weight for example, or having a very low sulphate content, for example of at most 600 ppm. Glasses containing iron, with a high redox but a low sulphate content also allow glasses to be obtained which have a residual blue colour which is particularly attractive and sought after in the field of flat glass for motor vehicles and for buildings, for example. Highly selective solar-protection glasses may thus be obtained on which may be deposited solar-protection layers in order to enhance the thermal performance characteristics thereof, for example layers of the TiN type, these being described especially in Patents EP-638,527 and EP-511,901.

The subject of the invention is also a melting and refining apparatus which is especially suitable for implementing the process described above and which comprises:
  at least one melting chamber equipped with burners which are fed with fossil fuel(s) of the (natural) gas type and with oxidizer(s) of the air or oxygen type, the said burners being placed so as to inject these gases or the gases resulting from the combustion below the level of the mass of vitrifiable materials introduced into the said melting chamber,
  means for forcing the molten vitrifiable materials to be refined in the form of a "thin layer", the said means being included in the melting chamber itself or in at least one refining compartment downstream of this chamber.

Advantageously, as mentioned previously, the melting chamber may be equipped with at least one means of introducing vitrifiable materials below the level of the melt, especially at least two of them, preferably in the form of an opening (or openings) in the associated wall(s), with a supply means of the feed-screw type. The risks of dust flying off are thus minimized, while at the same time also optionally allowing the introduction, above the melt, of the vitrifiable materials, such as silica, on which a preheating operation may be carried out without the risk of them setting solid.

Independently of the refining operation too, the invention also depends on design improvements with regard to the walls of the melting chamber which are intended to be in contact with the melt. Several variants are possible. In certain cases, known oxide-based refractory materials may be simply used, such as alumina, zirconia, chromium oxide and so-called AZS (alumina-zirconia-silica) refractories. It is generally preferred to combine them with a cooling system involving the circulation of a fluid of the water type (water jacket). The water jacket may be placed on the outside, the refractories then being in direct contact with the glass, or on the inside. The water jacket then has the function of creating a cooler stream of glass near the refractories, these being particularly stressed in this context as the melt generated by the submerged burners causes strong convective currents against the walls.

Another variant consists in using, in the melt zone, not refractories but only the abovementioned water jacket.

Another variant consists in using refractory materials (optionally combined with a cooling system of the water-jacket type) and in lining them with a lining made of a highly refractory metal such as molybdenum (or an Mo alloy). This lining may advantageously be held at some distance (for example from 1 to a few millimeters) from the walls of the refractories and may present the melt with a continuous contact surface (solid plate or plates made of Mo) or a discontinuous contact surface (Mo plate or plates drilled with holes). This lining has the purpose of mechanically preventing direct convection of the glass onto the refractories by generating a "still" layer of glass along the refractories, or even by preventing any contact of the glass with the latter.

In the melting chamber, all or some of the submerged burners are preferably designed so that they can inject, into the melt, a fluid which does not participate in the combustion by substituting (temporarily) for the oxidizer and/or the fuel. This fluid may be an inert gas of the $N_2$ type or a coolant of the liquid-water type which immediately vaporizes in the melt. The fact of thus temporarily stopping the combustion, while continuing to inject a fluid at the burner, generally has two objectives: either it is desired to stop the operation of the burner and more generally, for example, of the melting chamber in its entirety, the injection of inert gas of the $N_2$ type allowing the chamber to be made safe in the region of the burners, or it is desired to chance the burner for another while the other burners are operating and while it is therefore still in the presence of a glass melt. In this case, as explained in detail below, spraying water suitably via the burner allows the glass above the burner to be temporarily frozen, creating a kind of "bell", which allows a time long enough to carry out the change without glazing the burner.

According to the first variant mentioned above, the refining compartment is static. It includes a flow canal comprising a channel and a roof. The means for forcing the molten vitrifiable materials to be refined in the canal as a thin layer, especially to a depth of less than 15 cm, thus creating a plug-type flow, are, or example, of the structural kind and comprise appropriately selecting the ratio of the average height to the average width of the said canal, which ratio is less than 1 and even less than 0.5.

This canal may comprise together with or as an alternative to the previous means, means for forcing the vitrifiable materials to be refined as a thin layer in the form of means for controlling/regulating the flow of the materials at the inlet and/or at the outlet of the said canal, or just upstream of the latter.

This canal may comprise, together with or as an alternative to the previous means, other means for obtaining plug-flow thin-layer refining. In fact, these means generally consist in taking into account the flow of material through the refining compartment and the surface area developed by the bath of molten materials in the melting compartment, so as to determine the depth which is shallow enough to obtain a plug-flow thin layer. Moreover, the canal may be equipped with heating means, especially of the type having conventional burners arranged above the vitrifiable materials, preferably oxygen burners.

The canal may also be provided with means for homogenizing the vitrifiable materials, for example of the mechanical stirrer type.

According to the second variant, the melting chamber or the refining compartment downstream of the latter comprises at least one structural means for thin-film refining in the form of at least two approximately parallel adjacent walls which are intended to be submerged at least partly in the mass to be refined and are inclined with respect to the siege of the chamber or of the compartment. Preferably, these walls are incorporated into one or more of the tubular elements described above. Advantageously, they are placed in the actual melting chamber and emerge into the discharge opening downstream of the said chamber.

According to the third variant, the refining compartment includes at least one device capable of being rotated in order to ensure centrifugal refining, the internal walls of the said device substantially defining the shape of a hollow vertical cylinder, at least in its central part.

In order to force the vitrifiable materials to flow as a thin layer through this centrifugal device, the cavity in the latter may advantageously be equipped with one or more partitions, at least over part of its height, forcing the molten materials to flow between the internal walls of the device and these partitions, the average distance between the walls and the partitions defining the "thickness" of the thin layer. In fact, according to the invention, the parabolic profile adopted naturally by the molten glass when it is "freely" centrifuged, i.e. only contained by cylindrical-type external walls, is prevented from forming. In contrast, according to the invention, the glass is obliged to hug the walls of the device and the partitions installed in the body of the centrifuger, to a relatively constant thickness over the height of the centrifuger, and to a much smaller depth than if the abovementioned paraboloidal profile had been left to form. There is thus a considerable gain in efficiency, the bubbles bursting under the centripetal force much more quickly on the partitions, the path of the bubbles being much shorter. As in the static variant, the flow may be referred to as plug flow. This allows the height of the centrifuger to be reduced, with its size retaining the same performance characteristics. Preferably, the distance between partitions and walls is at most a few centimeters or is defined by the R1/R0 ratio of at least 0.8, the ratio being explained above.

According to a preferred design, the device is fed at the upper part with molten vitrifiable materials by a static supply means of the flow-canal type. These supply means may comprise at least one compartment at reduced pressure in order to a low the device to be fed and/or to allow a first refining operation to be carried out.

The device may advantageously be provided with means for trapping solid particles having a density greater than that of the glass, these means especially being located in its lower zone and being in the form of notches/grooves made in its internal walls. Preferably, the speed of rotation of the device is selected to be between 100 and 1500 revolutions per minute.

The device may also be provided with mechanical means which are stationary or which follow its rotation, and are capable of shearing the foam and of driving it downwards into the lower zone of the device from which the refined glass is drawn off. These means are especially in the form of pierced deflectors, or fins placed in the upper zone of the said device.

Figure 2:
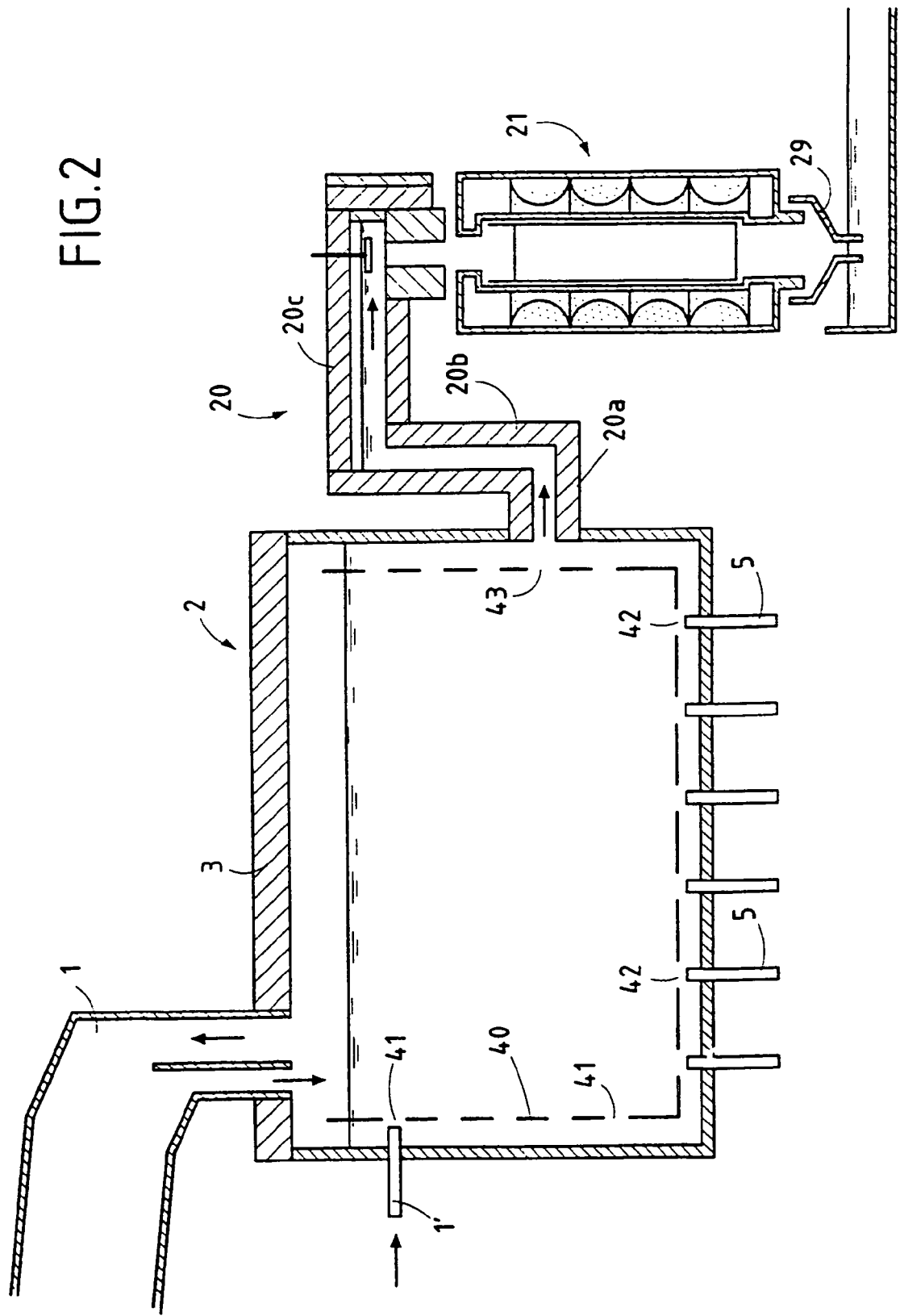
Figure 3:
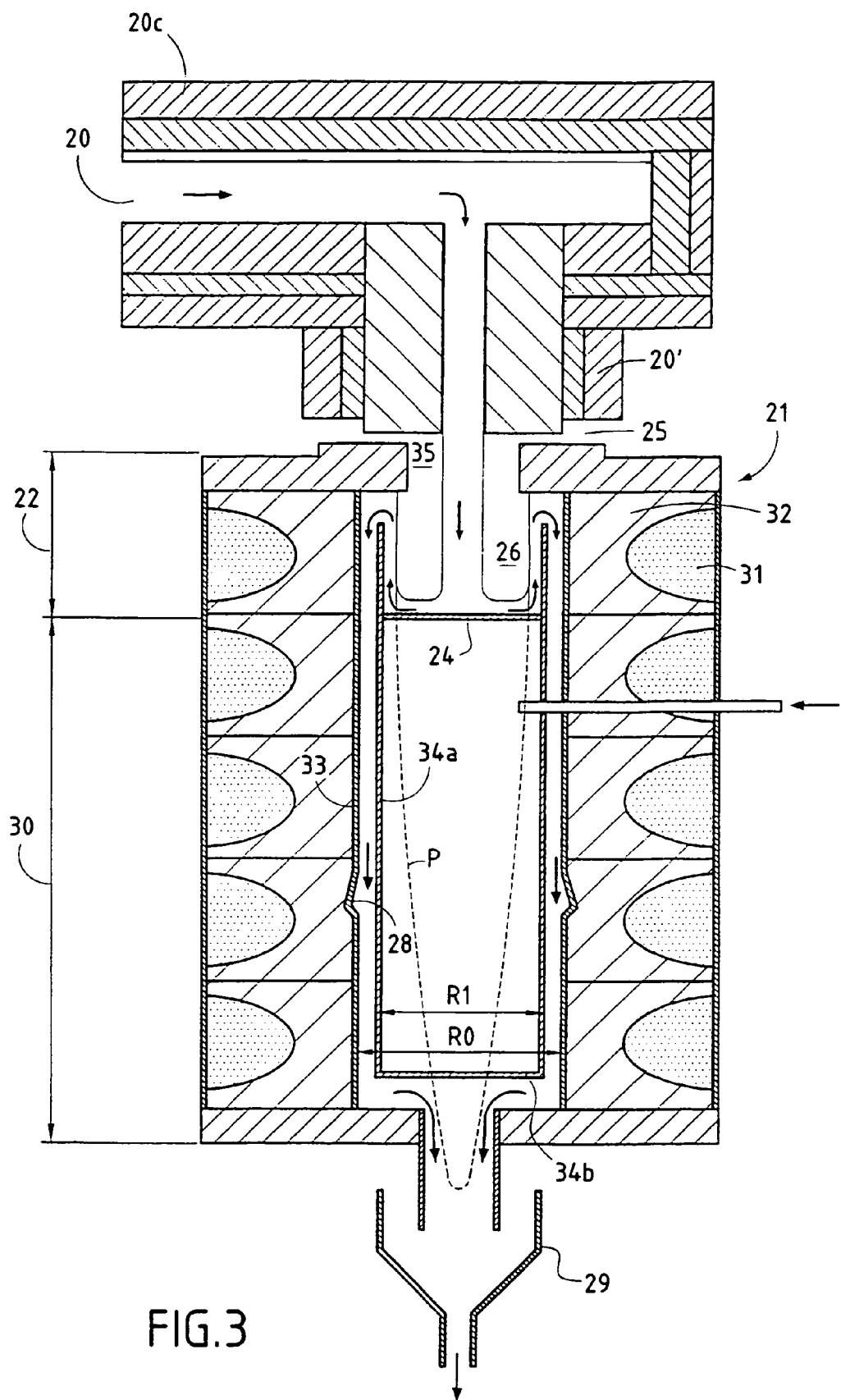

The invention will be explained in detail below with the aid of three non-limiting embodiments illustrated by the following figures:

FIG. 1: a diagrammatic melting/refining plant using a static refining apparatus;

FIG. 2: a diagrammatic melting/refining plant using a centrifugal refining apparatus;

FIG. 3: an enlarged view of the refining apparatus of the plant according to FIG. 2;

FIGS. 4, 4A-D: a schematic melting/refining plant using refining by lamellae in the actual melting chamber; and FIGS. 5, 5A, 5B: a schematic cross-sectional view of a submerged burner fitted into the melting chamber of the plants shown in the preceding figures.

These figures are not necessarily to scale and for the sake of clarity have been extremely simplified.

The apparatuses described below are designed to melt and refine glasses of highly varied compositions, in this case glasses intended to feed a float plant for producing flat glass. But this application is not limiting. These glasses may also feed, for instance, equipment for forming glass hollow-ware or fiberizing equipment of the internal-centrifuging device type.

Furthermore, of course, all the standard glasses of the silica-soda-lime type and various type of special glasses are particularly advantageous to manufacture using the apparatuses according to the invention, especially those deemed hitherto to be difficult to melt:

glasses having a low $Na_2O$ content and a relatively high alkaline-earth oxide, especially CaO, content, this being advantageous from an economic standpoint in terms of the cost of batch materials, but also glasses which are quite corrosive at conventional melting temperatures and which are relatively hard to melt using standard processes. These may be the glass compositions described, for example, in Patent FR 97/08261 of 1 Jul. 1997, such as (in % by weight):

| | |
|---|---|
| $SiO_2$ | 72-74.3% |
| $Al_2O_3$ | 0-1.6% |
| $Na_2O$ | 11.1-13.3% |
| $K_2O$ | 0-1.5% |
| CaO | 7.5-10% |
| MgO | 3.5-4.5% |
| $Fe_2O_3$ | 0.1-1% | or else of compositions of the type (expressed in percentages by weight):

| | |
|---|---|
| $SiO_2$ | 66-72, especially 68-70% |
| $Al_2O_3$ | 0-2% |
| $Fe_2O_3$ | 0-1% |
| CaO | 15-22% |
| MgO | 0-6, especially 3-6% |
| $Na_2O$ | 4-9, especially 5-6% |
| $K_2O$ | 0-2, especially 0-1% |
| $SO_3$ | traces. |

Another example illustrating this family of compositions is as follows:

| | |
|---|---|
| $SiO_2$ | 69% |
| $Al_2O_3$ | 1% |
| $Fe_2O_3$ | 0.1% |
| CaO | 18.9% |
| MgO | 5% |
| $Na_2O$ | 5.6% |
| $K_2O$ | 0.3% |
| $SO_3$ | traces. |

This glass has a lower annealing temperature, also called the strain-point temperature, of 590° C. (at which temperature the glass has a viscosity of 1014.5 poise). It also has a liquidus temperature of 1225° C., a temperature $T_{\eta=log2}$ of 1431° C. and a temperature $T_{\eta=log3.5}$ of 1140° C. ($T_{\eta=log2}$ and $T_{\eta=log\,3.5}$ correspond to the temperatures that the glass has when it reaches a viscosity, in poise, of log2 and log3.5, respectively). It has fire-resistant glass properties resulting from its high softening point (greater than 800° C.) and properties suitable for it to be applied in plasma screens because of its high "strain point".

glasses having a high silica content, these also being advantageous from the economic standpoint, and having a relatively low density, the compositional ranges of which, again expressed in percentages by weight, are as follows:

| | |
|---|---|
| $SiO_2$ | 72 to 80% |
| CaO + MgO + BaO | 0.3 to 14% |
| $Na_2O$ | 11 to 17% |
| alkaline oxides | 11 to 18.5% |
| $Al_2O_3$ | 0.2 to 2% |
| $B_2O_3$ | 0 to 2% |
| $Fe_2O_3$ | 0 to 3% |
| $SO_3$ | optionally traces |
| coke | 0-600 ppm | and optionally colouring oxides, for example the oxides of Ni, Cr, Co, etc.

(These glasses have the feature of being particularly viscous).

An example illustrating this family of compositions is as follows:

| | |
|---|---|
| $SiO_2$ | 76.4% |
| $Fe_2O_3$ | 0.1% |
| $Al_2O_3$ | 0.1% |
| CaO | 7.6% |
| MgO | 5% |
| $Na_2O$ | 10% |
| $K_2O$ | 0.3%. |

It has a relative density of approximately 2.46 (compared with relative densities of 2.52 for the standard silica-soda-lime glass of the "Planilux" type sold by Saint-Gobain Vitrage).

It was also seen above that the process according to the invention could be used to obtain reduced glasses, the high redox, the iron content and the very low sulphate content of which allow glasses with a residual blue colour to be obtained.

Using the process according to the invention, it is also possible to manufacture glasses having a zero or almost zero content of alkali metal oxides of the $Na_2O$ type, especially for the purpose of applications for fire-resistance glazing or for substrates used for the electronics industry. For such compositions, reference may be made especially to Patents EP-526,272 and EP-576,362.

Other glasses, especially those having a low MgO content, of the type described in Patents EP-688,741 and WO 96/00194 may also be manufactured using the process of the invention.

A first method of implementation is therefore shown in FIG. 1: a canal 1 simultaneously allows some of the vitrifiable materials to be introduced into the melting chamber 2 via the roof 3 and the combustion smoke to be removed. This smoke will preheat the vitrifiable materials, its thermal energy thus being recovered.

The batch materials capable of thus being introduced above the melt 7 especially comprise silica, which can be preheated without setting into a solid mass. The rest of the batch materials are injected at at least one point 1' located below the level of the melt 7, especially via an opening fed via a feed screw. Only one injection point has been shown here, this being furthermore placed rather high up with respect to the total height B of the melt, at about ⅔ of this height and on the front wall of the chamber.

In fact, several injection points may be provided in the walls (front walls or side walls) which may or may not be at this same height, especially in the upper half or in the lower half of this height B, for example between ⅓ and ⅔ of this height. In fact, this injection directly into the melt makes it possible to greatly reduce the amount of material flying off above the melt (emission of solid dust particles). Furthermore, depending on its configuration, it makes it possible to direct the materials at the point where the convective stirring is strongest and/or to take account of this in order for these materials to remain for at least the minimum period of time in the chamber 2 before passing into the refining zone.

The siege 4 of the chamber is equipped with rows of burners 5 which pass through it and penetrate into the melting chamber over a small height. The burners 5 are preferably provided with cooling means, not shown, of the water-jacket type. The burners 5 in operation develop combustion regions in zones 6, creating, near them, convective streams within the vitrifiable material being liquefied. This convective stirring creates a foam which will transfer the thermal energy throughout the melt 7. The melting preferably takes place at about 1350° C., for example in the case of a standard glass of the family of silica-soda-lime glasses.

The walls of the chamber 2 which are in contact with the melt 7 here are made of refractory materials cooled, on the outside, by a cooling system of the water-jacket type (not shown). A variant consists in that this cooling system, with metal walls, lies against the refractories but on the inside and is therefore in contact with the melt. These two variants make it possible to slow down the wear of the refractories by superficially cooling the glass near the walls of the refractories.

The operation of the burners 5 has been adapted to submerged melting in the manner shown very diagrammatically in FIG. 5. FIG. 5a shows a longitudinal section of a burner 5 and FIG. 5b shows a cross section, in the plane AA' indicated in FIG. 5a of the latter. The burner is jacketed with a cooling system 6.0 of the water-jacket type and has a central pipe 61 around which are concentrically placed a plurality of pipes 62, all these pipes of cylindrical section emerging in the nose of the burner 63.

In normal operation (operation [a]), the pipe 61 is fed with a combustible gas of the natural-gas type (or another combustible gas or fuel oil) and the pipes 62 are fed with oxidizer, in this case oxygen for example, the $CH_4/O_2$ interaction creating a combustion region in the melt.

In safety operation (operation [b]), that is to say when it is desired to stop the combustion at the burner without the risk of it being completely glazed, nitrogen is injected via the pipe 61 and/or via the pipes 62.

In operation intended to allow the burner to be exchanged for another (operation [c]), water is injected via the pipe 61, which water instantly vaporizes in the burner even in or right after leaving the burner, the vapour creating a kind of roof of cooled glass above the burner; any operation of the burner is then stopped and there is then enough time to carry out the exchange before the "roof" collapses. The injected water is at least partially collected in the burner by the pipes 62 (the roles of the pipes 61 and 62 in this operating mode may also be reversed). Any other coolant being thus able to freeze the glass may also be substituted.

The burner and its various operating modes described above form one subject of the invention, independently of the overall melting and refining operation involved in the glass plant.

The molten foamy glass resulting from the melting by submerged burners is then drawn off at the bottom part by a canal 8 optionally provided with means for adjusting the plug-type flow (not shown). The flow of the foamy glass entering the static refining compartment can thus be controlled. This compartment is in the form of a channel 9 defined by a runner 10 and a roof 11. It is equipped with oxygen burners 12. The vitrifiable materials flow through the channel, without a return current, over a height H of approximately 5 to 10 cm. This height is adjusted so as to have the desired plug flow in the channel 9, taking into account the densities of the molten materials in the melting chamber 2 and in the channel 9, as well as the heights l1 and l2 of the melts in these two zones. In order to obtain the desired thin layer, it is necessary here to raise the level of the channel 10 of the channel 9 with respect to that of the siege 4 of the chamber 2.

On the output side of the channel 9, a submerged dam 13 emersed to an adjustable depth in the melt allows the output flow to be adjusted; the refined glass pours out at the end of the channel 9 in order to feed a forming plant, here the chamber of a float bath for example. The refining is therefore carried out over a very shallow depth of glass, which shortens the path of the bubbles to the surface (their rate of rise being further facilitated when they are already predominantly at least 200 μm) and, because of the plug flow obtained, prevents them from sinking again in the course of rising in the melt.

FIGS. 2 and 3 show a second embodiment.

The significant difference compared with FIG. 1 resides in the way in which the walls of the refractories of the chamber 2 are protected. Here, submerged in the melt 7, there is a lining of refractory metal consisting of a thin wall 40 of molybdenum matching the shape of the cavity of the melting chamber and held in place at a distance of from one to a few millimeters from the walls of the refractories by means of suitable spacers and/or by being suspended in the melt from the walls of the refractories located above the melt or from the roof.

This sheet 40 is drilled with holes, firstly in its horizontal zone lining the siege 4, so as to be able to be penetrated by the burners 5, as well as in all its other walls, with a homogeneous distribution in the holes: this piercing therefore does not prevent contact between the refractories and the molten glass, however it mechanically breaks the convection movements of the glass near the refractories and thus reduces their rate of wear. The holes 41 in the walls of the lining 40, apart from those lining the siege, are preferably cylindrical and of varying dimensions, those in the wall on the siege side having at least to comprise holes 42 whose size is sufficient to allow the burners 5 to pass through them. The lining 40 must also be widely pierced (at 43) in its wall lining the downstream transverse wall of the chamber so that the glass can be removed via the canal 20a. The same applies to the zone 1' for introducing the batch materials: there is necessarily complementarity between the holes made in the walls made of refractories and in the lining made of molybdenum.

This Mo lining is in itself an invention, which is particularly appropriate in combination with a chamber for melting by submerged burners, independently of the way in which any subsequent refining may be carried out. (The same applies to the cooling, on the external side or the glass side, of the refractories, illustrated in the previous figure.)

The other difference with FIG. 1 resides in the way in which the glass is drawn off from the melting chamber. In the case of FIG. 2, the glass is drawn off slightly "higher up", with a supply pipe 20 split into a horizontal first part 20(a), a vertical second part 20(b) and a horizontal third part 20(c) feeding the apparatus of the centrifuger 21. Another variant consists in the molten glass being drawn off from the melting chamber at the top, for example by means of a submerged canal as is well known to those in the glass-making field.

FIG. 3 concentrates on the horizontal zone 20(c) of the canal 20 for supplying the molten foamy glass 20, drawn off from the melting chamber 2, which feeds the body of the centrifuger 21 via a pipe 20'. The centrifuger 21 has an upper part 22 lying between the neck 35 fed with glass to be refined and the metal plate 24, and a lower part 30 lying beneath the metal plate 24. Means (not shown) intended to control the flow of glass entering the centrifuger may be provided.

The glass descending via the neck 35 into the centrifuger is stopped in its fall by the metal plate 24 which, in combination with the upper part of the partition 34 described above, creates a kind of collector "basket". Due to the centrifugal force, the glass tends to rise in the zone 26 and then to pass over the partition 34; it thus flows from the zone 26 into the zone 30 in the form of a thin layer contained by the internal wall 33 of the centrifuger 21 on the one hand and by the partition 34 placed in the cavity of the centrifuger on the other hand. The internal wall 33 is approximately in the form of a cylinder of radius R0 and the partition 34 has a cylindrical zone 34(a) of radius R1, this zone being closed in the bottom part in the zone 34(b). The partition 34 is provided with centring means (not shown), just like the plate 24. Shown diagrammatically in dotted lines is the parabolic shape that the glass would have due to the centrifugal effect if there were no partition 34.

The partition 34 and the plate 24, may be made of molybdenum, at the very least for the parts which are completely submerged in the glass.

The outer shell of the internal wall 33 of the body of the centrifuger 21 may consist of electrocast refractory pieces 32 comprising a thermal insulator 31 incorporated so that the latter is not crushed by the centrifugal force. Also provided is a notch or groove 28 which goes around the internal wall of the part 30 (or is discontinuous), thereby allowing all the solid particles of density greater than that of the glass, of the refractory-inclusion type, to be trapped. During the centrifugal refining, the solid particles denser than the glass are thrown against the walls and trapped in the grooves 28 from which they can no longer emerge. On the other hand, the bubbles burst under the centripetal action towards the inside of the body of the centrifuger against the partition 34. Finally, in the lowest part of the part 30, the refined glass is drawn off via a channel by an approximately funnel-shaped receiving head 29. Under standard operating conditions, it is not necessary to provide glass-heating means, the speed of rotation may be about 700 revolutions per minute and the height h of the centrifuger may be, for example, 1 to 3 meters.

A third embodiment is shown in FIG. 4, which shows a melting chamber 2 identical to that in FIG. 1, which in addition is schematic and contains a system for refining in multiple thin layers. Here, the melting and the refining are therefore carried out in the same melting chamber, the glass being drawn off at the bottom part via the discharge orifice 8' into a canal 8 in order to feed forming machines directly, especially machines for fiberizing mineral wool or for forming bottles and flasks (this refining system could also be placed in a downstream compartment). The principle of such refining is as follows: tubular elements 50 made of molybdenum (or platinum) are used, the rectangular cross section of which is shown in FIG. 4d. These tubes are longitudinally partitioned by walls 51, thereby forming thin "lamellae" 52 open at the ends of the tube (for example 5 to 30 lamellae). These tubes 50 are submerged in the bath of vitrifiable materials being melted (hereafter termed "melt") as shown in FIG. 4a (a longitudinal sectional view of the melting chamber) and FIG. 4b (an elevation of the said chamber). The two tubes 50 are fastened to the side walls of the chamber, for example fixed to the walls by resting on ramps of refractory material, so as to be inclined at an angle α with respect to the plane of the siege 4, or else along axes Y converging on the longitudinal axis X of the furnace at the said angle α.

These two tubes 50 are arranged in this way as they may be easily fixed to the furnace walls and are at a significant distance from the burners. This configuration allows the molybdenum to be protected from the intense heating occurring near the burners. Likewise, it is preferable for these tubes to be completely submerged in order to prevent them from oxidizing in the air, otherwise the alternative being to provide a non-oxidizing atmosphere above the melt (especially an $N_2$ atmosphere). The two tubes 50 emerge in a collector tube 55 which feeds the discharge orifice 8 of the chamber.

The refining is carried out in the following manner: the gas to be refined enters the section of the tubes 50 in the top part 53 and then flows in the lamellae 52 in a descending path simply by gravity, as shown in FIG. 4c illustrating a typical lamella 52. The velocity of the glass in these lamellae 52 is a maximum at the centre of the lamellae and much lower at the walls 53, 53' which contain them. As regards the bubbles 60, these very rapidly reach, by rising, the upper wall 53 of the lamella 52, thus separating from the descending flow of glass shown by the arrow in FIG. 4c. Again, by rising, they are directed towards the inlet 66 of the tube 50, as a countercurrent to the glass flow, while the glass stripped of the bubbles reaches the bottom part 56 of the said lamella 52 and is removed directly via the collector 55 from the melting chamber.

The system is all the more effective the smaller the height h of each lamella 52 and the larger their surface area. This is particularly appropriate in the context of submerged-burner melting which tends to generate bubbles that have a relatively large diameter and therefore may be rapidly removed. It is possible to calculate the number, the height and the active surface area of these lamellae depending on the size of the bubbles to be removed, on the output of the melting chamber and on the viscosity of the glass, especially by also suitably choosing their length and angle of inclination according to the length of the melting chamber (or of the downstream compartment where they are located). By way of example, in the case of a melting chamber manufacturing 200 tonnes of glass per day, in order to remove all bubbles having a diameter greater than 250 microns, the tubes 50 may have dimensions 400×520×6550 mm³ and may each contain 20 lamellae, for a furnace length of about 6000 mm.

A variant of this embodiment consists in locating elements with similar lamellae in a downstream compartment.

In all cases (static or centrifugal refiner), it is clear that the size of the melting/refining apparatuses currently available may be spectacularly reduced. It has also been advantageous to add to the vitrifiable materials refining promoters, especially coke having a small particle size, sulphate, nitrate, fluorine or chlorine, the function of these promoters having been described above.

(In both the melting compartment and the refining compartment, it is possible to replace the molybdenum with platinum).

It is important to emphasize that, although the combination of melting by submerged burners with a refining step using reduced pressurization is extremely advantageous, the invention also relates to these two aspects taken separately. Thus, it may be advantageous to use the method of melting by submerged burners with a standard refining step and, reciprocally, to use a refining step with reduced pressurization following a melting step using conventional heating means, while still remaining within the scope of the invention, even if the synergy emphasized above is then no longer obtained.

It should also be noted that it may be advantageous to use the method of melting by submerged burners without any longer having to make any use of refining in the usual sense of the term. This may be the case in the field of fiberizing, in which it may be envisaged to feed the internal centrifugal fiberizing machines directly with foamy glass obtained using melting by submerged burners, the centrifuging necessarily carried out by this fiberizing technique achieving, de facto the refining of the glass. It is also possible to envisage direct treatment of the foamy glass coming from the melting operation, for the purpose of manufacturing foam glass used as insulation, for example in the building industry.

It is also possible to apply this method of melting for recycling glass/metal or glass/plastic composite products, as mentioned above, either to produce usable glass or to produce cullet for feeding a conventional glass-making furnace (depending, in particular, on the proportion of these composite products with respect to the rest of the more conventional vitrifiable materials).

The invention claimed is:

1. Refiner for refining glass in thin film form in which glass flows by gravity and/or centrifugal force, comprising at least one device capable of being rotated in order to carry out centrifugal refining, the device having internal walls substantially defining the shape of a vertical hollow cylinder at least in the central part of the device, inside which cylinder there are vertical partition(s), wherein the top of the partition(s) constrain molten glass flowing out between the internal walls and the partition(s).

2. Refining device according to claim 1, wherein $R_1/R_0$ is at least 0.8, $R_0$ being the mean radius of the cylinder in which the glass flows and $R_1$ being the mean radius of a cylindrical zone formed by at least one partition.

3. A process for centrifugal glass refining comprising supplying molten glass to the refiner of claim 2 and rotating the device to centrifugally refine glass.

4. The process of claim 3, wherein the device is rotated at a rotation speed between 100 and 1500 revolutions per minute.

5. The process of claim 3, wherein when the device is rotated, the molten glass does not form a parabolic profile inside the device.

6. Refiner according to claim 1, which is provided with means for trapping solid particles having a density greater than that of the glass.

7. Refiner according to claim 6, wherein the means have the shape of notches or grooves made in the internal walls of the device.

8. A process for centrifugal glass refining comprising supplying molten glass to the refiner of claim 7 and rotating the device to centrifugally refine glass.

9. The process of claim 8, wherein the device is rotated at a rotation speed between 100 and 1500 revolutions per minute.

10. The process of claim 8, wherein when the device is rotated, the molten glass does not form a parabolic profile inside the device.

11. A process for centrifugal glass refining comprising supplying molten glass to the refiner of claim 6 and rotating the device to centrifugally refine glass.

12. The process of claim 11, wherein the device is rotated at a rotation speed between 100 and 1500 revolutions per minute.

13. The process of claim 11, wherein when the device is rotated, the molten glass does not form a parabolic profile inside the device.

14. Refiner according to claim 1, wherein the device. is adapted to be supplied at its top with molten glass via a static intake means of the feeder type.

15. Refiner according to claim 14, wherein the intake means comprises at least one compartment under reduced pressure.

16. A process for centrifugal glass refining comprising supplying molten glass to the refiner of claim 15 and rotating the device to centrifugally refine glass.

17. The process of claim 16, wherein the device is rotated at a rotation speed between 100 and 1500 revolutions per minute.

18. The process of claim 16, wherein when the device is rotated, the molten glass does not form a parabolic profile inside the device.

19. A process for centrifugal glass refining comprising supplying molten glass to the refiner of claim 14 and rotating the device to centrifugally refine glass.

20. The process of claim 19, wherein the device is rotated at a rotation speed between 100 and 1500 revolutions per minute.

21. The process of claim 19, wherein when the device is rotated, the molten glass does not form a parabolic profile inside the device. is rotated, the molten glass does not form a parabolic profile inside the device.

22. Refiner according to claim 1, wherein the device includes a metal plate adapted to stop the glass to be refined from dropping, the plate forming with the top of the partition(s) a glass-collecting basket, adapted so that glass tends to rise and then pass over the partition(s) before subsequently flowing out in the form of a thin film.

23. A process for centrifugal glass refining comprising supplying molten glass to the refiner of claim 1 and rotating the device to centrifugally refine glass.

24. The process of claim 23, wherein the device is rotated at a rotation speed between 100 and 1500 revolutions per minute.

25. The process of claim 23, wherein when the device is rotated, the molten glass does not form a parabolic profile inside the device.

26. Refiner according to claim 1, wherein the glass is under atmospheric pressure.

27. Refiner for refining glass in thin film form, comprising at least one device capable of being rotated in order to carry out centrifugal refining, the device having internal walls substantially defining the shape of a vertical hollow cylinder at least in the central part of the device, inside which cylinder there is at least one partition in the form of a cylindrical zone, wherein the top of the partition(s) constrain molten glass flowing out between the internal walls and the partition(s), and a metal plate adapted to stop the molten glass to be refined from dropping, the plate forming with the top of the partition(s) a glass-collecting basket, adapted so that glass tends to rise and then pass over the partition(s) before subsequently flowing out in the form of a thin film.

* * * * *